Figure 1A:
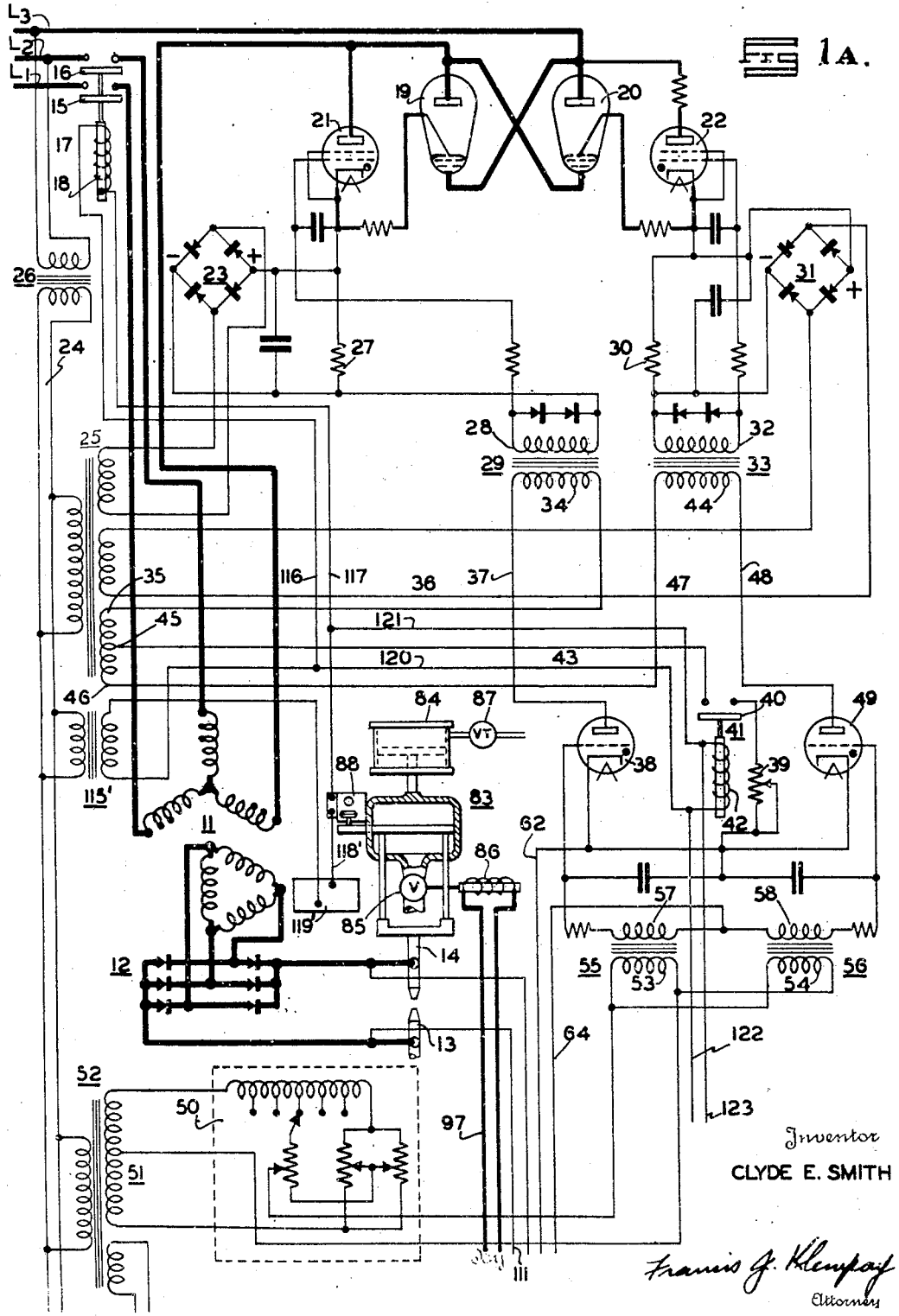
Figure 1B:
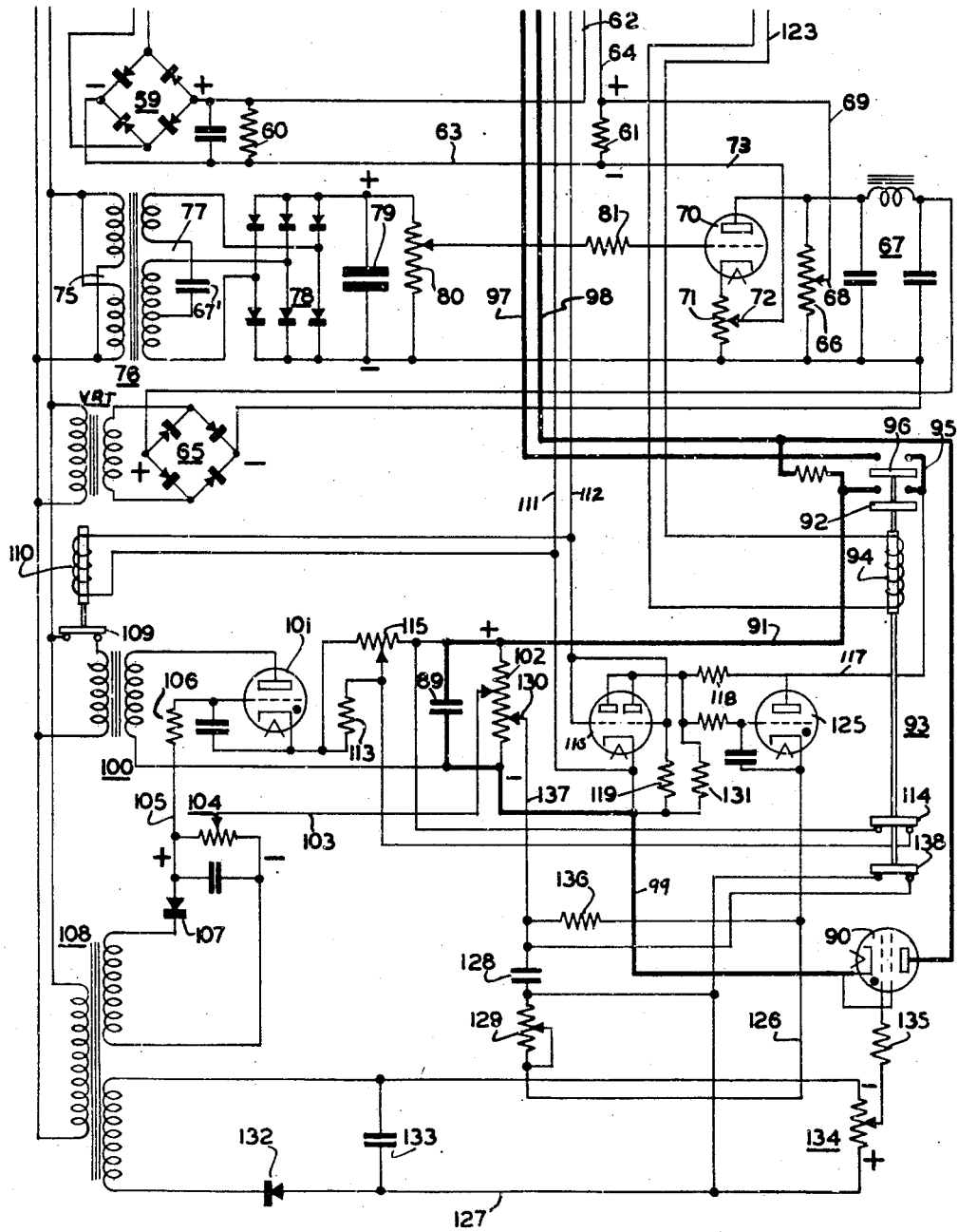

July 26, 1949.  C. E. SMITH  2,477,211
WELDING SYSTEM
Filed Dec. 16, 1943  2 Sheets-Sheet 1

Inventor
CLYDE E. SMITH
Francis J. Klempay
Attorney

July 26, 1949. C. E. SMITH 2,477,211
WELDING SYSTEM

Filed Dec. 16, 1943 2 Sheets-Sheet 2

Inventor
CLYDE E. SMITH
Francis J. Kleinpay
Attorney

Patented July 26, 1949

2,477,211

UNITED STATES PATENT OFFICE 2,477,211

WELDING SYSTEM

Clyde E. Smith, Warren, Ohio, assignor to The Taylor-Winfield Corporation, Warren, Ohio, a corporation of Ohio Application December 16, 1943, Serial No. 514,491

5 Claims. (Cl. 171—97)

This invention relates to electric resistance welding systems and more particularly to improved methods, circuits, and devices for translating the electrical energy to the weld and for controlling the operation of the translating means employed. A primary object of the invention is the provision of an improved system for furnishing direct current energy to the weld from an alternating current source. The application of such current, particularly of large values and short durations of flow, has been found advantageous for certain welding operations principally in the field of alloys and while it has heretofore been proposed to employ systems utilizing a welding transformer and a rectifier interposed between the output of the transformer and the welding load such systems have not been amenable to proper or efficient control. It is accordingly a more specific object of the invention to provide in a welding system having means to furnish a uni-directional welding current from an alternating current source an improved arrangement for controlling the flow of welding energy. While the employment of the rectifier and the consequent furnishing of the uni-directional current to the welding machine proper lessens welding inconsistency which is due to the inductive effect of the adjacent welding current carrying parts of the machine and of the variable position of the work in the throat of the machine variations in line voltage continue to lend inconsistency to the welding results and another object of the invention is to eliminate this inconsistency entirely in a welding system of the kind involved.

A further object of the invention is the provision of improved, simplified and more economic circuit arrangements for controlling the flow of electrical energy from a polyphase source of current to a welding load. Normally, when the welding machine is once set up an effective range of control of the welding energy furnished may be maintained within 50% of the capacity range of the machine. This control may include automatic voltage compensation as mentioned above and, in addition, the usual heat control to provide an adjustment to compensate for variations in the dimensions or character of the stock and in the quality of the weld being produced. In the conventional three-phase three-wire supply circuit an effective control of more than ample range may be provided by controlling in a modulating manner the conduction in but one of the conductors while simple open or closed contactors are employed in the other two conductors.

A still further object of the invention is the provision of an improved circuit arrangement for modulating the flow of energy from a supply circuit to a load circuit in accordance with variations in voltage in the supply circuit.

Yet another object of the invention is the provision of improved and materially simplified circuit arrangements for modulating the flow of energy from a polyphase source of electrical power to a welding load in accordance with variations in the voltage of the source.

Other objects of the invention include the provision of improved circuit arrangements for actuating a welding pressure changing device in timed sequence following the initiation of the flow of welding current and for utilizing such control in a direct current welding system.

Other objects and advantages of the invention will become apparent upon consideration of the following detailed specification and the accompanying drawing wherein there is specifically disclosed a preferred embodiment of the invention.

The single figure of the drawing, on two sheets, is a schematic diagram of a spot welding system constructed in accordance with the principles of the invention.

Referring to the drawing, L1, L2 and L3 will be the line conductors of a conventional three-phase source of alternating current while reference numeral 11 indicates a welding transformer, the primary of which is connected in star and adapted to be connected to the line conductors L1, L2, L3 while the secondary of which is connected in delta for furnishing low voltage electrical power to the full wave welding rectifiers 12. Rectifiers 12 are of the dry plate type having sufficient surge capacity to handle the heavy currents normally employed in welding operations and, as shown, the output thereof is connected to fixed electrode 13 and to the movable electrode 14 of the welding machine. While I have shown the electrodes as being of stud form, it should be apparent that the invention is equally applicable to welding systems generally including seam welders employing wheel electrodes.

Conductors L1 and L2 are arranged to be connected, in the preferred and illustrated embodiment of the invention, to the primary winding of the transformer 11 through the contactors 15 and 16 of a relay 17 having an energizing coil 18. The third conductor L3 of the source is connected to the primary of transformer 11 through the valves 19 and 20, connected in inverse parallel, and preferably of the ignitron type. As such, valves 19 and 20 each has an anode, a mercury pool cathode and an ignition electrode arranged to be energized at controlled times during the half cycles of the current source. For this purpose, a discharge device 21 of the gas filled type is connected across the anode and ignition electrode of the valve 19 and a similar device 22 is provided for the valve 20. Normal negative grid bias sufficient to hold the device 21 non-conducting is furnished by a rectifier 23 deriving energy from a control current line 24 through a transformer 25. Line 24 may be energized through a transformer 26 on the conductors L2, L3. The output of rectifier 23 developes a voltage across the resistor 27 which is in the grid biasing circuit for the device 21, the circuit including the secondary 28 of the grid transformer 29. Similarly normal negative grid bias for device 22 is developed across a resistor 30 by a rectifier 31 also deriving energy from transformer 25. Resistor 30 is in the grid circuit for device 22, which circuit also includes the secondary winding 32 of the grid transformer 33.

The primary 34 of transformer 29 is in a circuit which may be traced from an end terminal 35 of a center-tapped secondary winding of the transformer 25 through conductor 36, winding 34, conductor 37, anode-cathode of a grid controlled gas discharge device 38, potentiometer 39, contactor 40 of a relay 41 having an energizing coil 42, and conductor 43 to the center tap 45 of said secondary winding. The primary 44 of transformer 33 is in a circuit which may be traced from the other end terminal 46 of said secondary winding through conductor 47, winding 44, conductor 48, anode-cathode of a grid controlled gas discharge device 49, and then through resistor 39 and contactor 40 to the center tap 45. Thus by the initiation of conduction in the tubes 38 and 49 at predetermined times during the positive or negative half cycles of potential appearing across the valves 19 and 20 the grid transformers 29 and 33 will be impulsed to permit the valves 19 and 20 to translate predetermined portions of the respective half cycles of energy as will be well understood.

To provide for a base or "heat" control through the devices 38 and 49 of the quantity of energy transmitted by the valves 19 and 20 I provide a phase shifting circuit 50 the input of which is connected to a center-tapped winding 51 of a transformer 52, the primary of which is connected to the control current line 24 and the output of circuit 50 is impressed on the primary windings 53 and 54 of grid transformers 55 and 56, respectively. The secondary of transformer 55, indicated by reference numeral 57, is in the grid circuit of the tube 38 while the secondary 58 of the transformer 56 is in the grid circuit of the tube 49. Thus conduction in tubes 38 and 49 is initiated during the respective half cycles at times determined by the phase deviation effected by the adjustment of the circuit 50 and in this manner a basic control or adjustment of the total energy furnished is attained.

To provide compensation for voltage fluctuation in the supply circuit whereby a predetermined constant current is furnished the weld irrespective of variations in the line voltage I introduce in the grid biasing potentials furnished the control devices 38 and 49 a direct current component which varies in accordance with line voltage conditions. For this purpose a rectifier 59 deriving energy from transformer 52 is employed to develope a constant reference potential across a resistor 60 and this resistor 60 is placed in the grid biasing circuits of the devices 38 and 49 and also in series with these circuits is a resistor 61 the effect of which will be explained below. Such circuits may readily be traced from the cathodes of the devices 38 and 49 through conductor 62, resistor 60, conductor 63, resistor 61, conductor 64, and thence through windings 57 and 58 to the grids of tubes 38 and 49, respectively. Means is provided to develop across resistor 61 a potential variable in accordance with variations in line voltage and in opposition to the potential developed across resistor 60. For this purpose a rectifier 65 deriving energy from line 24 through transformer VRT of the voltage regulating type is provided to develop a uniform potential across a resistor 66, a filter 67 being employed to smooth out the ripples in the output. Resistance 66 is provided with a sliding tap 68 which is connected to the grid end of resistor 61 by means of the conductor 69. Also connected across the output of rectifier 65 and filter 67 is the anode-cathode of a grid-controlled space discharge device 70 and a resistance 71 in series. The latter is provided with an adjustable tap 72 which is connected to the cathode end of resistor 61 by means of conductor 73. The current flowing in tube 70 determines the potential at tap 72 and consequently the potential at resistor 61. As the tube 70 draws more current the voltage at 61 is raised thus driving the direct current component of the grid bias impressed on the tubes 38 and 49 more positive, forcing them to conduct earlier during the half cycles of the voltage wave.

Conduction in tube 70 is controlled in accordance with the voltage in the current supply line (L2, L3 in the embodiment illustrated) by means now to be described. Connected across the lines L2, L3 through transformer 26 and line 24 is the primary winding 75 of a transformer 76 the secondary 77 of which feeds a full wave rectifier 78 which is preferably of the dry plate type and the output of which is impressed across a relatively small capacitor 79 and a parallel resistance 80 of a potentiometer. The negative end of resistance 80 is connected to the cathode of tube 70 through resistor 71 while the movable tap of the resistance 80 is connected to the control grid of the tube 70 through the usual grid resistor 81. Thus as the voltage drops in the conductors L2, L3 the output of rectifier 78 is diminished as is also the potential developed across resistance 80 and therefore the positive bias on tube 70 is lowered causing it to conduct less current the effect of which is to cause earlier conduction in the control devices 38 and 49 as explained above. While I have shown the line voltage determining means (75—80) as being responsive only to the voltage of the phase carried by conductors L2, L3, it should be apparent that the full wave three-phase rectifier 78 may equally as well be powered by all the phases if it is desired to do so.

The improved pressure changing valve solenoid actuating circuit of the invention will now be described. This circuit consists essentially of a solenoid energizing circuit and a control circuit to initiate the flow of energy in the energizing circuit at an accurately timed interval following the establishment of a reference condition which in the present case is the initiation of flow of current through the weld. Reference numeral 83 indicates a floating double bellows interposed in the line of drive between the primary actuating cylinder 84 and the movable electrode 14 of the welding machine. Assembly 83 having an exhaust valve 85 operated by solenoid 86 may be of the type specifically disclosed and claimed in co-pending application Serial No. 482,630, now Patent No. 2,363,753 of M. A. Seeloff and C. E. Smith. To perform a welding operation a valve 87 which is normally automatically actuated by appropriate sequencing circuits is provided to admit fluid pressure to the upper end of cylinder 84 to effect downward movement of the assembly 83 and electrode 14. A switch 88 forms a part of assembly 83 and as explained more in detail in said co-pending application, this switch closes upon yielding of the assembly 83.

Solenoid 86 is arranged to be energized by discharge of a capacitor 89 effected by conduction in a grid controlled gas discharge device 90, the discharge circuit being traceable from the positive terminal of capacitor 89 through conductor 91, contactor 92 of a relay 93 having an actuating coil 94, conductor 95, contactor 96 of relay 93, conductor 97, coil 86, conductor 98, tube 90, and conductor 99 to the negative terminal capacitor. Capacitor 89 is arranged to be charged from control current line 24 through transformer 100 and rectifier 101 of the controlled gaseous type and to control the potential to which capacitor 89 is charged a potentiometer has its resistance 102 connected across the capacitor and a movable tap thereof connected to the control grid of rectifier 101 through conductor 103, the grid end portion of potentiometer 104, conductor 105, and grid resistor 106. A constant biasing potential is developed across the resistance element of potentiometer 104 by a rectifier 107 deriving energy from line 24 through a transformer 108. The polarities of the potentials are as indicated on the drawing and it should be apparent that as the potential across resistance 102 raises to a predetermined adjusted value conduction in rectifier 101 will be interrupted and remain interrupted upon the momentary opening of contactor 109 placed in the primary circuit of transformer 100. Contactor 109 is arranged to be opened momentarily by a coil 110 which is energized during flow of welding current by means of the conductors 111 and 112. The charging circuit for capacitor 89 further includes a current limiting resistor 113 and a contactor 114 of the relay 93 in series across a current limiting resistor 115 of greater value than resistor 113 so that immediately upon reclosure of contactor 109 (cessation of welding current) the charging can proceed at a high rate.

Energizing coil 18 of relay 17 is arranged to be energized from line 24 through a transformer 115, conductor 116, conductor 117, switch 88, conductor 118, and a timer 119 which may be of the type which opens a circuit therethrough upon the expiration of a preselected period of time. Switch 88 likewise controls the energization of coil 42 of relay 41 from transformer 115 through conductors 120, 121, 118, and timer 119. Similarly switch 68 controls the actuation of relay 93 from transformer 115 through conductors 120, 122, 123, 118, and timer 119. Thus upon the application of proper welding pressure welding current begins to flow and all the control circuits are conditioned for operation. Closure of contactors 92 and 96 of relay 93 conditions the energizing circuit for solenoid 86 as explained above and the closure of contactor 92 further conditions a timing circuit, now to be described, the function of which is to control the time of energization of solenoid 86.

A space discharge device 116 is connected across capacitor 89 through lead 91, contactor 92, conductor 117, and resistor 118. The cathode and control grid of tube 116 are coupled by means of resistor 119 so that the tube is normally at zero bias and begins to draw full current immediately upon closure of contactor 92 which occurs at the start of the flow of welding current. Thus substantially the full voltage of the capacitor 89 appears across the resistor 118. In parallel with resistor 118 and tube 116 is a grid controlled gaseous discharge device 125, the circuit of the same being traceable from lead 117, anode-cathode of tube 125, conductor 126, a timing capacitor 128, a variable resistor 129, a movable tap 130, and the negative end of resistance 102 to the opposite terminal of capacitor 89. Tube 125 is normally held non-conductive by the negative bias impressed through resistor 131, which resistor normally carries no current and which is connected to the negative end of resistor 118.

Conductor 111 which is connected to the positive side of the output of rectifier 12 is connected directly to the cathode of tube 116 while the control grid or grids of the tube is connected directly to the conductor 112 which leads from the negative side of the rectifier output. Upon appearance of rectifier voltage in the leads 111 and 112 conduction in tube 116 is thus substantially diminished or cut off thereby dividing the voltage of the capacitor 89 between resistors 118 and 131. The drop in resistor 131, being in opposition to the normal grid bias impressed on the tube 125 initiates conduction in this tube and commences the charging of timing capacitor 128 through the circuit above outlined. By means of certain arrangements now to be explained conduction in tube 90 is initiated upon the capacitor 128 attaining a predetermined charge, the time required to attain such charge being determined by the setting of the variable resistance 129. A source of grid biasing potential for tube 90 is provided by the rectifier 132 deriving energy from transformer 108 and impressing its output across a capacitance 133 and the resistance element of a potentiometer 134. The adjustable tap of potentiometer 134 is connected to the control grid of tube 90 through grid resistor 135 and the grid return circuit may be traced through potentiometer 134, conductor 127, resistor 129, conductor 126, a resistor 136, conductor 137, potentiometer 102, and conductor 99 to the cathode of the discharge device 90. Upon the capacitor 128 attaining a preselected charge and a consequent development of sufficient potential across resistors 136 and 129 which is in opposition to the normal negative bias impressed on device 90 conduction is initiated in the discharge device 90 to dump the energy from capacitor 89 into the coil 86 through the energizing circuit therefor outlined above. In this manner solenoid 86 is furnished with sufficient energy to properly actuate the relief valve 85 at the expiration of an accurately measured interval following the initiation of flow of welding current to the electrodes 13 and 14. A normally closed contactor 138 on relay 93 effects the complete discharge of the timing capacitor 128 between successive welding operations.

It should be understood that a control system of the nature described above is normally utilized in a complete welding machine having appropriate circuits and devices for effecting continuous automatic operation of the same. For example, such machine may, following the teaching of the prior art, include means to periodically actuate valve 87 and further means operable in timed sequence following actuation of valve 87 to turn or raise the piston in cylinder 84 to open the electrodes and the switch 88 following the completion of a welding operation. The circuits of the control system are then restored to their conditions indicated in the drawing in preparation for the next succeeding welding cycle.

It should now be apparent that I have provided an improved electric resistance welding system and improved circuits having especial utility in connection with such systems which accomplish the objects initially set out. The invention provides a simplified and wholly practical arrangement for controlling the flow of energy from a multiple phase alternating current source to a direct current load including the further modification of the control in accordance with variations in the voltage of the source. The invention also provides an entirely practical and accurate circuit for effecting the timed application of a change in a critical welding condition during a welding cycle as explained above and, moreover, teaches how such a circuit may be advantageously incorporated in a direct current resistance welding system.

The above specifically described embodiment of the invention should be considered as illustrative only as obviously many changes may be made therein without departing from the spirit or scope of the invention. For example, insofar as certain obvious aspects of the system are concerned the mechanical contactors 15 and 16 which control conduction in two of the current source conductors may, if desired, be replaced by suitable electronic discharge devices connected back to back as will be understood. In this case the voltage compensation control feature of the invention would be applied to each of the phases controlled by electronic devices, it being observed that in accordance with statements made above the single voltage responsive circuit including the rectifier 78 may be employed to vary the fixed direct current component of control grid bias of all the control devices. Reference should therefore be had to the appended claims in determining the scope of the invention.

What I claim is:

1. In an electric power system having a multiple phase source of alternating current, a load circuit, and translating means to furnish said load circuit with electrical energy from each of the phases of the source; the combination of switching means to connect and disconnect one phase of said source with said translating means, means comprising a pair of reversely connected electric discharge devices for interconnecting another of the phases of said source with said translating means, said devices each having a control element to initiate conduction in said devices at predetermined points in the voltage wave of the said another phase of said source, means comprising a phase shifting circuit to determine the points in the said voltage wave at which conduction in said devices is initiated to effect a basic control over the quantity of energy furnished said load circuit, and means to shift said conduction points in response to voltage variations in said source whereby the quantity of energy furnished said load circuit is maintained substantially constant regardless of voltage variations in said source.

2. In an electric power system having a multiple phase source of alternating current, a load circuit, and translating means to furnish said load circuit with electrical energy from each of the phases of the source; the combination of switching means to connect and disconnect one phase of said source with said translating means, means comprising a pair of reversely connected electric discharge devices for interconnecting another of the phases of said source with said translating means, said devices each having an electrical element to initiate conduction in said devices at predetermined points on the voltage wave of said another phase of said source, and means to shift said conduction points in response to voltage variations in said source whereby the quantity of energy furnished said load circuit is maintained substantially constant regardless of voltage variations in said source.

3. In an electric power system having a multiple phase source of welding current, a load circuit, translating means to furnish said load circuit with electrical energy from each of the phases of the source, and an initiating switch; the combination of means operable automatically upon closing of said switch to connect one phase of said source with said translating means, means comprising a pair of reversely connected electric discharge devices for interconnecting another of the phases of said source with said translating means, said devices each having a control element to initiate conduction in said devices at predetermined points in the voltage wave of said another phase of said source, an energizing circuit for said control elements, and means to condition said energizing circuit automatically upon closing of said initiating switch.

4. A system according to claim 3 further including means in said energizing circuit to shift the conduction points of said devices in response to voltage variations in said source whereby the quantity of energy furnished said load circuit is maintained substantially constant regardless of voltage variations of said source.

5. A system according to claim 3 further including means in said energizing circuit for shifting the conduction points in said devices with respect to the voltage wave of said another phase of said source to effect a basic control over the quantity of energy furnished said load circuit, and further means in said energizing circuit to shift said conduction points in response to voltage variations in said source whereby the quantity of energy furnished said load circuit is maintained substantially constant regardless of voltage variations in said source.

CLYDE E. SMITH.

REFERENCES CITED

The following references are of record in the file of this patent:

UNITED STATES PATENTS

| Number | Name | Date |
| --- | --- | --- |
| 2,082,644 | Lord | June 1, 1937 |
| 2,092,545 | Alexanderson | Sept. 7, 1937 |
| 2,113,664 | Simmie | Apr. 12, 1938 |
| 2,147,468 | Stoddard | Feb. 14, 1939 |
| 2,175,841 | Kafka et al. | Oct. 10, 1939 |
| 2,221,576 | Dawson | Nov. 12, 1940 |
| 2,315,916 | Whiteley et al. | Apr. 6, 1943 |
| 2,329,122 | Leathers et al. | Sept. 7, 1943 |
| 2,356,859 | Leathers et al. | Aug. 29, 1944 |
| 2,406,429 | Mahoney | Aug. 27, 1946 |